United States Patent [19]

Kice

[11] 4,309,729

[45] Jan. 5, 1982

[54] MAGNETIC TAPE CASSETTE REPRODUCING AND/OR RECORDING SYSTEM

[76] Inventor: Warren B. Kice, 9429 Tobin Cir., Potomac, Md. 20854

[21] Appl. No.: 159,464

[22] Filed: Jun. 16, 1980

[51] Int. Cl.³ .............................................. G11B 15/00
[52] U.S. Cl. .................................... 360/72.1; 360/74.3; 360/92; 360/74.2; 360/69; 360/63; 242/189
[58] Field of Search ...................... 360/12, 13, 15, 92, 360/93, 137, 69, 74.1, 72.1, 63, 74.3, 74.2, 73, 71; 179/100.1 C, 100.1 PS, 100.4 PT, 100.1 R; 242/200–203, 190, 189, 187; 369/2, 34

[56] References Cited

U.S. PATENT DOCUMENTS

| | | | |
|---|---|---|---|
| 3,295,853 | 1/1967 | Cheng | 360/13 |
| 3,560,666 | 2/1971 | Bookman | 360/92 |
| 3,851,116 | 11/1974 | Connon | 360/72.2 |
| 3,869,719 | 3/1975 | Jenkins | 360/74.4 |
| 3,968,329 | 7/1976 | Darwood | 179/6 R |
| 4,000,518 | 12/1976 | Stearns | 179/100.1 PS |
| 4,014,039 | 3/1977 | Yosunaga | 179/100.1 VC |
| 4,114,834 | 9/1978 | Hooke | 360/92 |
| 4,118,744 | 10/1978 | Sata | 360/74.2 |
| 4,121,262 | 10/1978 | Ushio | 360/13 |
| 4,122,500 | 10/1978 | Bradford | 360/13 |

OTHER PUBLICATIONS

Sanyo Brochure.

Primary Examiner—Bernard Konick
Assistant Examiner—Alan Faber
Attorney, Agent, or Firm—Lane, Aitken, Kice & Kananen

[57] ABSTRACT

A magnetic tape reproducing and/or recording system in which two magnetic cassette tape transports are mounted on the same chassis and are adapted to selectively drive magnetic tape from two separate type cassettes past separate head assemblies to reproduce and/or record magnetic signals on the tape. The arrangement is such that the second tape cassette is automatically actuated upon the tape in the first cassette reaching its end, and vice versa. Logic circuitry is provided which controls the tape transports so that, after completion of the first cassette tape it can be rewound to a starting position during play of the second tape, and vice versa. A single set of recording and playback electronics can be provided which are automatically switchable between the respective head assemblies depending on the particular operational mode.

25 Claims, 4 Drawing Figures

MAGNETIC TAPE CASSETTE REPRODUCING AND/OR RECORDING SYSTEM

BACKGROUND OF THE INVENTION

This invention relates to a magnetic cassette tape reproduction and/or recording system and, more particularly, to such a system in which dual tape transports and associated head assemblies are provided on the same chassis.

The advent of the magnetic tape cassette, in which a supply of tape along with a supply hub and a tape-up hub are disposed in a self-contained housing, has revolutionized the home market for tape recording equipment largely since the cassette is extremely convenient to use and yet provides reasonably good sound quality.

When the tape cassette and its associated reproducing and/or recording apparatus, hereinafter referred to as "deck", was originally introduced, there was a significant gap in sound quality between it and the traditional open-reel tape decks. However, this gap has been narrowed considerably with the introduction of improved tape transports, improved noise reduction systems, metal alloy tape, and electronic techniques to provide frequency dependent equalization, adequate overload margins in the recording stage and proper matching of the signal current from the record amplifier to the record head. However, the one area in which the open-reel deck still holds a significant advantage over the cassette deck is in the length of play/recording time. For example, many popular open-reel decks utilize ten and one-half inch reels and a tape speed of three and three-quarter inches per second which provides the user with three hours of uninterrupted program material. However, when operating an audio cassette deck at the standard speed of one and seven-eighths inches per second with the most popular "C-90" cassette, the user is provided with only forty-five minutes of uninterrupted program material.

Attempts have been made to alleviate this major problem by providing the tapes with additional lengths which permit uninterrupted play for sixty minutes and even ninety minutes, and/or reducing the speed to fifteen-sixteenths inches per second. However, both of these techniques result in much less than optimum performance from a sound quality standpoint, since they introduce severe compromises in the recording and playback processes.

One other solution to extend the playing time of an audio cassette deck has been to provide an "automatic reverse" feature in which the tape travels in one direction for its complete length and then automatically reverses so that it travels in the other direction. Although this has proved to be a satisfactory compromise for non-critical applications, it still has practical time limitations since the C-90 cassette would be limited to a ninety minute program. In addition, the reversing technique requires movement of the tape heads to another section of the tape which requires expensive hardware. Also, in these arrangements, it is extremely difficult to maintain a critical alignment of the tape heads, which is essential to avoid the possibility of compromising the sound quality.

SUMMARY OF THE INVENTION

It is therefore an object of the present invention to provide a magnetic tape cassette reproducing and/or recording system in which the playing time of the cassette is doubled when compared to that of a conventional system without the necessity of reversing the direction of the tape and changing position of the tape heads.

It is a further object of the present invention to provide a system of the above type in which a single deck is provided which has two transport systems and head assemblies for accommodating two cassette tapes.

It is a still further object of the present invention to provide a system of the above type in which the aforementioned transport systems and head assemblies are sequentially actuated to provide for sequential playing and/or recording of the cassettes to double the available playing time.

It is a still further object of the present invention to provide a system of the above type in which a single set of recording and playback electronics are provided which are sequentially switched between the two sets of head assemblies in accordance with the particular cassette tape to be played and/or recorded.

It is a still further object of the present invention to provide a system of the above type in which logic circuitry is provided in cooperation with the transport systems and head assemblies to permit automatic rewinding of one of the tape cassettes when the other cassette is in its play mode, and vice versa.

Toward the fulfillment of these and other objects, the magnetic tape cassette reproducing and/or recording system of the present invention comprises two tape transports mounted on a chassis and adapted to accommodate two tape cassettes. Each transport is adapted to pass tape from the supply reel of its associated cassette, past a head assembly, and to the takeup reel of the cassette. Electronic logic and control circuitry is provided which is responsive to the tape of one cassette reaching its end for deactivating the corresponding transport and activating the transport associated with the other cassette. A single set of recording and playback electronics can be provided which are switchable by the aforementioned circuitry between the head assemblies associated with the transports.

BRIEF DESCRIPTION OF THE DRAWINGS

The above description, as well as further objects, features and advantages of the present invention will be more fully appreciated by reference to the following detailed description of a presently preferred by nonetheless illustrative embodiment in accordance with the present invention, when taken in conjunction with the accompanying drawings wherein.

DESCRIPTION OF THE PREFERRED EMBODIMENTS

Figure 1:
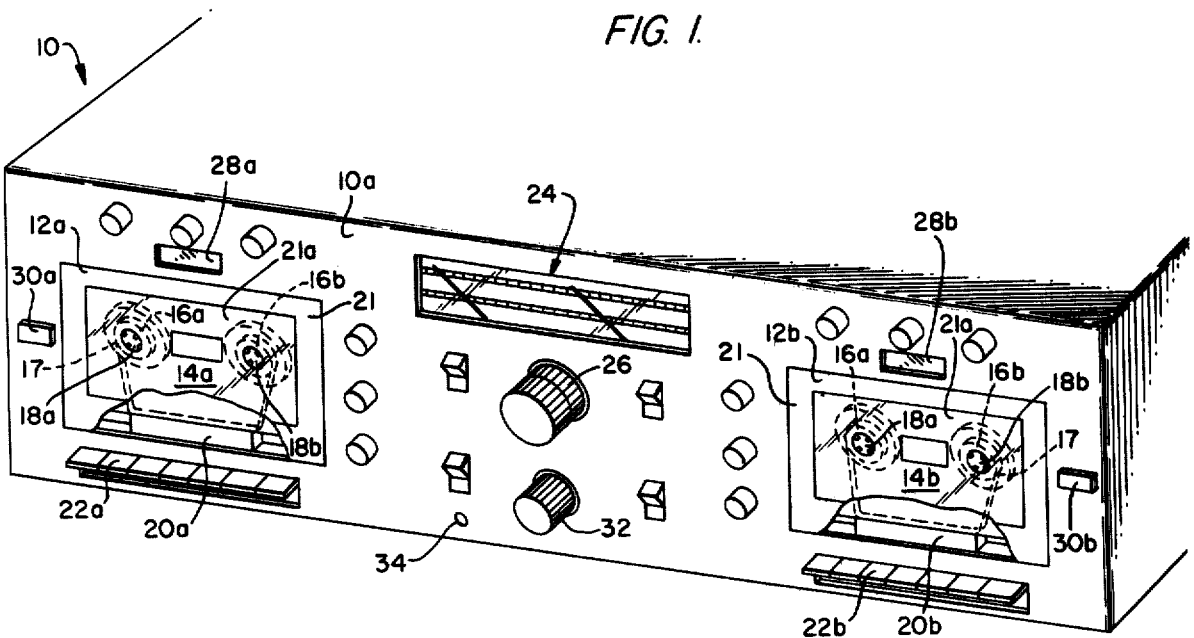
FIG. 1 is a perspective view of a magnetic tape cassette reproducing and/or recording system incorporating features of the present invention.

Referring to FIG. 1, the reference numeral 10 refers in general to a chassis, or housing, of a magnetic tape cassette recording and reproducing apparatus, or deck, of the present invention which, for the purposes of example, is utilized in connection with the Phillips-type audio tape cassette. The deck is of the "front-load" type and has a front panel 10a which defines two compartments, or wells, 12a and 12b which receive tape cassettes 14a and 14b respectively. Each cassette 14a and 14b is provided with a supply hub 16a and a takeup hub 16b (shown by dashed lines since they are located within the cassette housing) for receiving a supply of tape 17. The cassettes 14a and 14b are inserted into the compartments 12a and 12b in a manner so that two openings provided in the hubs 16a and 16b of each cassette extend over, and in driving engagement with, two spindles 18a and 18b, respectively, of a tape transport system associated with each compartment and described in detail later. The spindles 18a and 18b along with suitably formed mounting blocks formed in the compartments 12a and 12b provide a support for the cassettes 14a and 14b immediately above two tape head assemblies 20a and 20b, respectively, which will be described in detail later. A hinged cover plate 21 including a window 21a is provided in association with each compartment 12a and 12b to cover the cassettes 14a and 14b.

Two arrays of pushbuttons 22a and 22b are located immediately below the compartments 12a and 12b, respectively, and are adapted to control the respective tape transport systems in a manner to be described in detail later.

A metering system, shown in general by the reference numeral 24, is provided on the front plate 10a and is adapted to control the recording and/or playback levels of the signals applied to, or coming from, the cassettes 14a and 14b under the control of a dual concentric level control knob 26 mounted immediately below the meters. Two meters are provided since two separate signals would be normally involved to permit the reproduction and/or recording of stereophonic music.

A pair of tape counters 28a and 28b are mounted immediately above the compartments 12a and 12b, respectively, and are adapted to operate in a conventional manner to provide a digital readout corresponding to the amount of tape passing between the supply hub 16a and the takeup hub 16b of each tape cassette 14a and 14b.

An array of additional controls are provided on the deck and include a pair of tape eject buttons 30a and 30b for providing a release of the tape from the compartments 12a and 12b. Also, a function select switch 32, in the form of a multi-position rotary knob, is provided for selecting the particular transport operation sequence as will be described later. Further, a headphone output jack 34 is provided for interfacing with conventional plugs formed on headphones. Additional controls (not referenced) are shown which can provide for a selection of operational modes, inputs, tape bias and equalization, noise reduction, etc.

Figure 2:
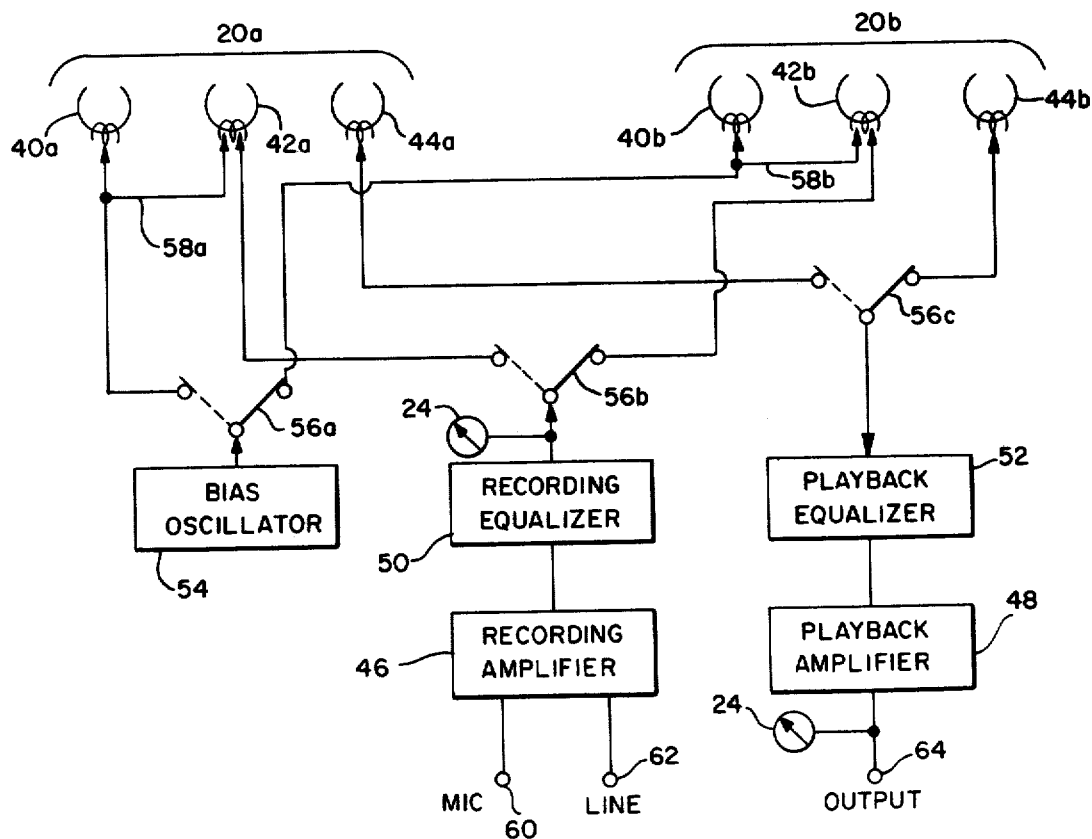
FIG. 2 is a schematic view of the head assemblies and the recording and playback electronics utilized in the deck of FIG. 1.

Referring to FIG. 2, the tape head assemblies 20a and 20b are shown, which include bias heads 40a and 40b, record heads 42a and 42b, and playback heads 44a and 44b. Shown schematically is a recording amplifier 46 and a playback amplifier 48 which are electrically connected to a recording equalizer 50 and a playback equalizer 52, respectively. A bias oscillator 54 is provided and, along with the recording equalizer 50 and the playback equalizer 52, is adapted to be selectively connected to the head assembly 20a or to the head assembly 20b by a switching assembly consisting of switches 56a, 56b and 56c, respectively. More particularly, the switch 56a is adapted to selectively connect the bias oscillator 54 between the bias heads 40a and 40b by conventional circuitry including the insulated conductors shown, while switch 56b is adapted to selectively connect the recording equalizer 50 between the heads 42a and 42b, and the switch 56c is adapted to selectively connect the playback equalizer 52 between the playback heads 44a and 44b. A pair of conductors 58a and 58b extend from the conductors extending between the bias oscillator 54 and the bias heads 40a and 40b, respectively, to the recording heads 42a and 42b, respectively, to provide a bias signal to the latter heads in a conventional manner.

A microphone input terminal, or jack, 60 and a line input terminal 62 are both connected to the recording amplifier 46, and an output terminal 64 extends from the playback amplifier 48. The above described metering system 24 is shown connected between the recording equalizer 50 and the switch 56b and between the playback amplifier 48 and the output terminal 64. It is understood that switching circuitry can be provided in association with the metering assembly 24 so that it can selectively display the input to the recording heads 42a and/or 42b or the output from the playback amplifier 48 in a conventional manner.

It is understood that although the above described circuit has been described in connection with a single, "mono" signal, the components shown will be duplicated throughout for providing for the recording and playback of a stereo signal.

Figure 3:
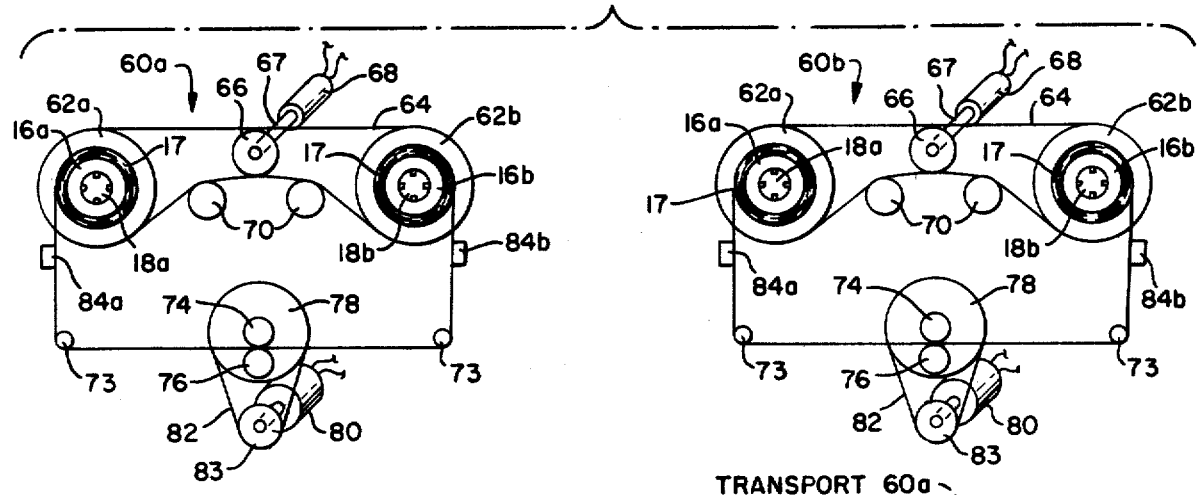
FIG. 3 is a schematic view of the tape transport apparatus utilized in the deck of FIG. 1.

The two transport assemblies associated with the cassettes 14a and 14b are shown in general by the reference numerals 60a and 60b in FIG. 3. Since the transport assembly 60b is identical to the assembly 60a, the latter will only be described in detail.

Each transport assembly includes a pair of pulleys 62a and 62b to which the spindles 18a and 18b are attached. A endless loop drive belt 64 extends around the pulleys 62a and 62b, and a drive pulley 66 extends between the two pulleys 62a and 62b in driving engagement with the belt 64. The output shaft 67 of a electronically controlled DC motor 68 is directly connected to the drive pulley 66 through a flywheel or the like, to drive the latter pulley. A pair of guide rollers 70 are provided in engagement with the belt 64 so that, upon actuation of the motor 68, the drive pulley 66 rotates in either direction to drive the pulleys 62a and 62b and, therefore, the spindles 18a and 18b and the hubs 16a and 16b, respectively. As a result, the tape 17 winds or unwinds between the hubs 16a and 16b and passes around two guide pins 73 associated with the cassette 14a, and between a capstan 74 and a pinch roller 76. The capstan 74 is connected to a flywheel 78 which is driven at a constant speed by a second electronically controlled DC motor 80 by virtue of a drive belt 82 extending between the flywheel 78 and a drive pulley 83 connected to the output shaft of the motor 80.

The design and function of the spindle motors 68 are such that each motor 68 drives its respective tape in the normal play modes and in a "fast forward" or "rewind" mode, depending on the direction of rotation selected. Each capstan motor 80 and, therefore, its corresponding capstan 74 drives its respective tape at a constant speed in the normal "play" mode in a direction from left to right, i.e., from the supply hub 16a to the takeup hub 16b.

Although not shown in FIGS. 1-3 in the interest of clarity, it is understood that a movable carriage assembly is provided for each head assembly 20a and 20b and its associated pinch roller 76 to selectively move the head assembly and pinch roller to and from a position in engagement with the tape 17 of its correspondence cassette 14a and 14b, respectively. The carriage assembly can include a bidirectionally operative solenoid that effects the above movement in a conventional manner. The carriage assemblies would normally operate to move the head assemblies 20a and 20b, respectively, and their corresponding pinch rollers 76 between a position in engagement with the tape for the "play" modes and a position slightly spaced from the tape in the "stop", "fast forward" and "rewind" modes.

A pair of end-of-tape sensors 84a and 84b are provided adjacent the supply hub 16a and takeup hub 16b of each cassette 14a and 14b, respectively, and are adapted to respond to the end of the tape 17 associated with its respective hub being reached for providing an output signal. In this context, each end of the tape in a tape cassette is normally secured to a leader tape which, in turn, is secured to the takeup hub and supply hub. Thus when the tape winds out from either hub, the corresponding leader tape is placed in tension and the corresponding spindle and hub cease to rotate. Therefore, the sensors 84a and 84b each can be in the form of a motion sensor which includes a magnetic transducer with a reed relay that senses the motion of the spindles 18a and 18b, respectively, and normally creates a pulse which maintains a capacitor in a charged condition which keeps a transistor turned on. When either spindle 18a or 18b ceases rotation in response to the end of the tape being reached, as a result of the tape completely unwinding from its respective hubs 16a and 16b, the transistor associated with the corresponding sensor 84a or 84b is cut off which applies voltage to another transistor(s) that actuates a solenoid that disengages the function switch associated with the spindle motor 68 and the capstan motor 80. Alternatively, the sensors 84a and 84b can each be in the form of a tension sensor which responds to the tension in the leader tape created when the corresponding end of the magnetic tape is reached for generating a similar output signal as disclosed in U.S. Pat. No. 4,118,744.

Figure 4:
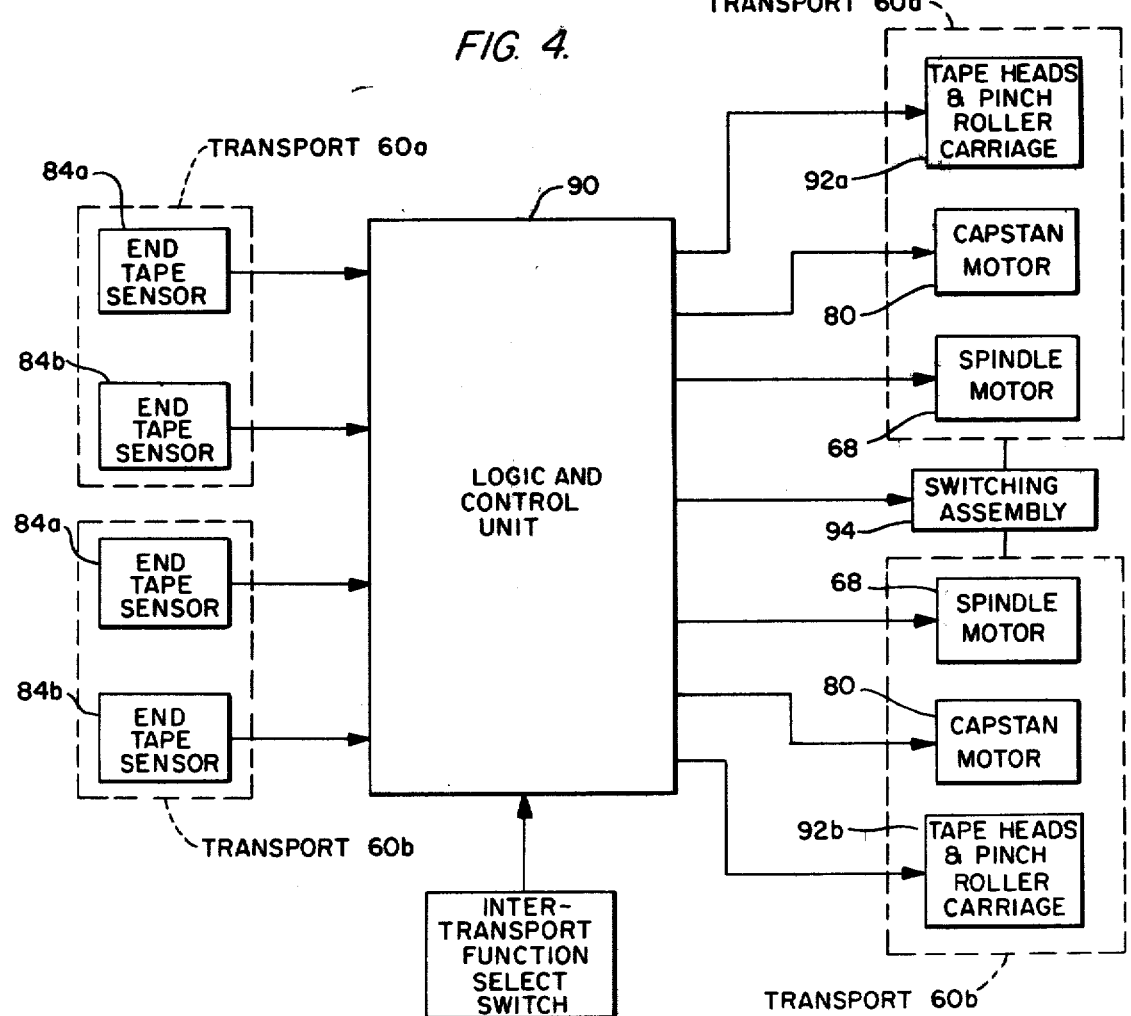
FIG. 4 is a diagrammatic view of the logic circuitry utilized in the deck of FIG. 1.

A logic and control system suitable for use with the system of the present invention is illustrated in FIG. 4 and includes the above-described function select switch 32 mounted on the front panel 10a of the chassis 10 and connected to a logic and control unit 90. The end-of-tape sensors 84a and 84b for the tape transport 60a and the end-of-tape sensors 86a and 86b for the tape transport 60b are also connected to the logic and control unit 90 for providing end-of-tape signals as described above. The logic and control unit 90 is also connected to the spindle motor 68 and to the capstan motor 80 of each transport 60a and 60b for selectively activating the transports. In addition, the logic and control unit 90 is connected to the above-mentioned carriages for the tape head assemblies 20a and 20b and the pinch rollers 76, with said carriages being referred to by the reference 92a and 92b for the purposes of FIG. 4. The logic and control unit 90 selectively activates and deactivates the carriages 92a and 92b for selectively engaging and disengaging the tape assemblies 22a and 22b and the pinch rollers 76 with the magnetic tape 17 of the cassettes 14a and 14b, respectively.

The end-of-tape sensors 84a and 84b are designed to provide a signal to the logic and control unit 90 indicating that an end of the tape 17 has been reached as a result of the tape being fully unwound from the hubs 16a and 16b of each cassette 14a and 14b respectively as discussed above. For example, when the tape transport 60a is operating in a playback (PB) mode, with the hub 16b functioning as a takeup hub and the hub 16a functioning as a supply hub, the end-of-tape sensor 84a will provide an end-of-tape signal when the tape is fully unwound from the hub 16a and fully wound on the hub 16b. Conversely, when the tape transport 60a is in a rewind (RW) mode with the hub 16a thus functioning as a takeup hub and the hub 16b thus functioning as a supply hub, the end-of-tape sensor 84b will provide an appropriate end-of-tape signal when the hub 16b is fully unwound and the hub 16a is fully wound. In a like manner, the end-of-tape sensors 86a and 86b of the tape transport 60b operate similarly to provide similar end-of-tape signals.

The logic and control unit 90 is also adapted to receive the appropriate function control indication from the function select switch 32 and the end-of-tape sensors 84a and 84b and provide the desired sequential control signals for the recording and playback electronics switching assembly, consisting of the switches 56a, 56b and 56c shown in FIG. 2 and referred to in general by the reference numeral 94 in FIG. 4.

The spindle motor control portion of the logic and control unit 90 is designed to drive the spindle motors 68 in a fast mode in either direction for effecting the fast-forward (FF) and rewind (RW) modes as well as a slow mode for the playback (PB) and record (REC) modes. The logic and control unit 90 is designed to drive the capstan motors 80 at a constant speed to achieve the desired tape speed which preferably is the standard speed of one and seven-eighths inches per second.

The logic and control unit 90 may take one of several forms including solid state logic or, more preferably, a firmware controlled microprocessor that provides the logic necessary to effect the functions described more fully below.

As indicated above, the tape transport 60a and the tape transport 60b are each individually provided with the usual controls to permit independent operation, these controls including playback (PB), record (REC) fast-forward (FF), rewind (RWD), auto-stop (AS) and pause (P). The function select switch 32 provides the necessary supervisory control signal to the logic and control unit 90 to permit the tape transport user to select one of the following playback modes:

| 1  | A(PB/AS)  | B(PB/AS)  |          |          |
|----|-----------|-----------|----------|----------|
| 1a | A(PB/RWD) | A(PB/RWD) |          |          |
| 2  | B(PB/AS)  | A(PB/AS)  |          |          |
| 2a | (PB/RWD)  | A(PB/RWD) |          |          |
| 3  | A(PB/RWD) | B(PB/RWD) | A(PB/RWD)| B(PB/RWD)|

Mode 1. In this mode, the transport 60a is activated by pressing the "play" selector associated with the latter transport. This actuates the motor 68, the motor 80 and the carriage 92a which indexes the tape head assembly 20a and the pinch roller 76 into engagement with the tape 17 of the cassette 14a. The tape transport 60a thus commences its playback (PB) mode and continues in this mode until its end-of-tape sensor 84a generates an output signal in response to the tape 17 from the cassette 16a being fully unwound from its supply hub 16a. This end-of-tape signal from the sensor 84a is provided to the logic and control unit 90 which then provides the appropriate control signals to cause the tape transport 60a to auto-stop (AS) by turning off or disengaging the corresponding spindle motor 68 and capstan motor 80 and retracting the carriage 92a to an inoperative position. Simultaneously, the logic and control unit 90 provides a control signal to activate the switching assembly 94 to switch the playback and rewind electronics from the tape head assembly 20a to the assembly 20b. Also, the logic and control unit 90 provides a control signal to the tape transport 60b to activate it to operate in the playback mode (PB) mode by activating the corresponding capstan motor 80 and the spindle motor 68. In addition, the unit 90 activates the carriage 92b to move it to an operative position with the head assembly 20b and the pinch roller 76 in engagement with the tape 17 of the cassette 14b. When the end-of-tape sensor 84b of the tape transport 60b generates an output signal in response to the tape 17 being is fully unwound from the supply hub 16a of the cassette 14b, the logic and control unit 90 causes the tape transport 60b to auto-stop (AS) as described above.

Mode 1a. In this mode, both transports 60a and 60b operate sequentially in the playback modes described above but when the end-of-tape signal is provided from their respective sensors 84a, the logic and control unit 90 provides the proper control signals to cause the corresponding tape transport to rewind (RW) and then auto-stop (AS).

Mode 2. This mode is essentially identical to that described above under Mode 1 except that the playback sequence is in the reverse order. More specifically, the tape transport 60b is first operated in the playback (PB) mode until the corresponding end-of-tape sensor 86a indicated that the tape 17 of the cassette 16b is fully unwound from its supply hub 16a. The logic and control unit 90 then causes the tape transport 60b to auto-stop (AS). Substantially simultaneously with the end-of-tape signal provided from the latter sensor 86a, the switching assembly 94 is activated to switch the record and playback electronics to the tape transport 60a which is caused to operate in its playback (PB) mode and auto-stop (AS) when the appropriate end-of-tape signal is provided from its end-of-tape sensor 84a.

Mode 2a. This operating mode is essentially the same as that described above in connection with mode 1a except that the sequence is in the reverse order. More specifically, tape transport 60b is operated in its playback (PB) mode until an end-of-tape signal is received from the corresponding sensor 86a. This results in the logic and control circuit 90 switching the transport 60b to a rewind mode and the transport 60a to its playback (PB) mode. After this mode is completed the end-of-tape signal from the corresponding sensor 86a causes the transport 60a to switch to its rewind mode. Of course, after their respective rewind modes are completed both transports 60a and 60b receive an auto-stop (AS) command from the logic and control circuit 90 when the respective end-of-tape signals is provided from their corresponding sensors 86b.

Mode 3. This is a continuous operating mode in which operation is transferred from transport 60a to transport 60b and then back to transport 60a, and so on, in a continuous manner. More specifically, the transport 60a is operated in its playback (PB) mode. When the tape 17 of the cassette 14a is fully unwound from its supply hub 16a, the corresponding sensor 84a generates a signal that is received by the logic and control unit 90 which then causes the transport 60a to rewind (RW) and then stop (AS), and substantially simultaneously switches the recordings and playback electronics to the head assembly 20b and places the transport 60b in its playback (PB) mode. When the end-of-tape sensor 86a associated with the transport 60b generates a signal in response to the tape of the cassette 14b being fully unwound from the supply hub 16a, this signal is used to place transport 60b in its rewind (RW) mode and then its stop (AS) mode and switches the recording and playback electronics to the head assembly 20a and switches the transport 60a to a playback (PB) mode. In this way, the logic and control unit 90 controls the transports 60a and 60b in a manner to effect continuous operation of the transports, resulting in uninterrupted playback of the program material on the cassettes 14a and 14b.

The playback modes 1, 1a, 2 and 2a can also be used in a "record" mode by pressing the record function switch so that a continuous recording occurs throughout the length of both tapes, after which both transports 60a and 60b are either stopped or perform the rewinding functions discussed above.

Referring again to FIG. 3, an alternate feature of the present invention is shown in dashed lines and consists of a single capstan motor 80' which would be provided in place of the two capstan motors 80 shown. The motor 80' is connected to the drive pulleys 83 by two drive belts 96a and 96b, restively, extending around the pulleys 83 and around a switchable-clutch pulley mechanism, shown in general by the reference numeral 98, which is connected to the output shaft of the motor 80'. The mechanism 98 would be connected to, and controlled by, the logic and control unit 90 and would selectively drive the belts 96a and 96b and, therefore, the capstans 74 associated with the transports 60a and 60b, restively, depending on the particular operating mode. It is understood that the two motors 68 could also be replaced by a single motor 68 which would be selectively connected to the drive belts 64 in a similar manner.

It is also understood that other variations can be made within the scope of the invention. For example, instead of providing the switchable system for switching one set of recording and/or playback electronics between the two transport systems, separate recording and/or playback electronics could be provided with each deck. This would permit two recordings of the same program source to be made simultaneously on the two cassettes 16a and 16b with provisions being made for switching the metering system 24 between the respective electronics. This would also permit a "dubbing" feature to be incorporated into the system of the present invention. In the latter mode, one of the transports would be utilized to play a previously recorded cassette and the output from its associated playback electronics would be connected directly into the input of the recording electronics associated with the other transport to perform the "dubbing" function.

It is also understood that the system of the present invention can be easily interfaced with a microprocessor or the like for providing random search and access to a predetermined selection on a prerecorded tape. According to this technique, the transport performs a searching function by "fast forwarding" to each individual selection on a prerecorded tape by sensing the "silence" between each selection to provide random access to a particular selection on the tape, such as shown in U.S. Pat. No. 4,014,039. It can be appreciated that with the ability of the system of the present invention to play back two tape cassettes, the microprocessor can be programmed to not only provide random selection on each tape cassette, but can switch randomly back and forth between the tape cassettes with one transport performing its searching function while the other is operating in its normal playback mode, to provide even greater flexibility in program source selection.

Further, it is understood that the system of the present invention can be designed to include the "automatic reverse" feature discussed above in which case the playback mode discussed above would consist of a tape of each cassette unwinding from its supply hub to its takeup hub and then back from its takeup hub to its supply hub.

Still further, the system of the present invention is not limited to the use of Phillips-type audio cassettes but is equally applicable to mini-cassettes and micro-cassettes for audio and cassettes (such as VHS and BETA) for reproducing and/or recording video signals.

A latitude of other modifications, changes and substitution is intended in the foregoing disclosure and in some instances some features of the invention will be employed without corresponding use of other features. Accordingly, it is appropriate that the appended claims be construed broadly and in a manner consistent with the spirit and scope of the invention therein.

What is claimed is:

1. A tape cassette deck comprising a first means on said chassis for receiving a first tape cassette, second means on said chassis for receiving a second tape cassette, first transport means on said chassis and operable in a first mode in which it unwinds the tape of said first cassette from its supply hub to its takeup hub at a constant speed and in a second mode in which it rewinds said tape from its takeup hub to its supply hub at a relatively fast speed, second transport means mounted on said chassis and operable in a first mode in which it unwinds the tape of said second cassette from its supply hub to its takeup hub at a constant speed and a second mode in which it rewinds said latter tape from its takeup hub to its supply hub at a relatively fast speed, sensing means for responding to either one of said transport means completing its unwinding mode for generating an output signal, control means connected to said sensing means and to said first and second transport means for switching the other of said transport means to its unwinding mode and for switching said one transport means to its rewinding mode in response to said generation of said output signal.

2. The deck of claim 1 wherein said sensing means responds to the tape of its corresponding cassette completely unwinding from either one of its hubs.

3. The deck of claim 1 wherein said first and second transport means each includes a supply spindle and a takeup spindle for drivingly engaging corresponding hubs to which the tapes of said cassettes are attached and wherein said sensing means responds to cessation of motion of one of said spindles as a result of the tape completely unwinding from its corresponding hub.

4. The deck of claim 1 wherein said first and second transport means each includes a supply spindle and a takeup spindle for drivingly engaging corresponding hubs to which the tapes of said cassettes are attached and wherein said sensing means responds to the tension of said tape resulting from the tape completely unwinding from its corresponding hub.

5. The deck of claim 1 wherein said control means is also adapted to selectively deactivate each of said transport means in response to said generation of said output signal before switching said transport means to the unwinding or rewinding modes.

6. The deck of claim 1 wherein said control means includes means for controlling said first and second transport means so that they play only preselected selections on their respective tapes.

7. The deck of claim 6 wherein said control means controls said first and second transport means in a manner so that while one of said transports is searching for a preselected selection, the other transport is operating in a normal playback mode.

8. The deck of claim 1 wherein each of said head assemblies include recording and playback means.

9. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, sensing means for responding to the cessation of motion of one of the hubs of said first cassette as a result of the tape of said first cassette completely unwinding from said hub for generating an output signal, and control means connected to said sensing means, said control means being responsive to said output signal for activating said second transport means.

10. The deck of claim 9, further comprising recording and playback electronics including amplification means mounted on said chassis for electronically altering the signals passed to and from said head assemblies, said control means adapted to switch said recording and playback electronics from an operative relation with said first head assembly to an operative relation with said second head assembly in response to said generation of said output signal.

11. The deck of claim 9 wherein said control means also switches said first transport means to a rewinding mode in response to said output signal.

12. The deck of claim 11 wherein said control means deactivates said first transport means in response to said generation of said output signal before switching said first transport means to said rewinding mode.

13. The deck of claim 12 wherein said control means deactivates said first transport means after completion of said rewinding.

14. The deck of claim 13 further comprising additional sensing means for responding to the tape of said second tape cassette reaching its end for generating a second output signal.

15. The deck of claim 14 wherein said control means is responsive to said second output signal for switching said second transport means to a rewinding mode and switching said first transport means to an unwinding mode.

16. The deck of claim 15 wherein said control means deactivates said second transport means in response to said generation of said second output signal before switching said second transport means to said rewinding mode.

17. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, sensing means for responding to the tension of the tape of said first cassette resulting from the latter tape completely unwinding from its corresponding hub for generating an output signal, and control means connected to said sensing means and to said first and second transport means, said control means being responsive to said output signal for activating said second transport means.

18. The deck of claim 17 wherein said control means also switches said first transport means to a rewinding mode in response to said output signal.

19. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, sensing means for responding to the tape of said first cassette reaching its end after said unwinding for generating an output signal, control means connected to said sensing means and to said first and second transport means, said control means being responsive to said output signal for switching said first transport means to a rewinding mode and said second transport means to an unwinding mode, and additional sensing means for responding to the tape of said second tape cassette reaching its end for generating a second output signal, said control means being responsive to said second output signal for switching said second transport means to a rewinding mode and switching said first transport means to an unwinding mode.

20. The deck of claim 19 wherein said control means deactivates said first transport means after its rewinding mode and before it is switched to its unwinding mode.

21. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, sensing means for responding to the tape of said first cassette reaching its end after said unwinding for generating an output signal, and control means connected to said sensing means and to said first and second transport means, said control means being responsive to said output signal for switching said first transport means to a rewinding mode and activating said second transport means, said control means includes means for controlling said first and second transport means so that they play only preselected selections on their respective tapes.

22. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, each head assembly including recording and/or playback heads for recording and/or playing back information on said tape during said unwinding and rewinding, sensing means for responding to the tape of said first cassette reaching an end after said unwinding and rewinding for generating an output signal, and control means connected to said sensing means and to said first and second transport means, said control means being responsive to said output signal for activating said second transport means.

23. The deck of claim 22 wherein said control means deactivates said first transport means in response to said output signal.

24. The deck of claim 29 further comprising additional sensing means for responding to the tape of said second cassette reaching its end after its rewinding for generating a second output signal, said control means being responsive to said second output signal for activating said first transport means and deactivating said second transport means.

25. A tape cassette deck comprising a chassis, first means on said chassis for receiving a first tape cassette, second means on said chassis for receiving a second tape cassette, a first head assembly on said chassis and associated with said first means for engaging the tape of said first tape cassette, a second head assembly on said chassis and associated with second means for engaging the tape of said second tape cassette, first transport means on said chassis and associated with said first means for unwinding and rewinding the tape of said first cassette relative to said first head assembly, second transport means mounted on said chassis and associated with said second means for unwinding and rewinding the tape of said second cassette relative to said second head assembly, sensing means for responding to the tape of said first cassette reaching its end after said unwinding for generating an output signal, and control means connected to said sensing means and to said first and second transport means, said control means being responsive to said output signal for activating said second transport means, said control means includes means for controlling at least one of said transport means so that it plays only preselected selections on its respective tape.

* * * * *